US006868111B1

(12) United States Patent
Oleynik

(10) Patent No.: US 6,868,111 B1
(45) Date of Patent: Mar. 15, 2005

(54) METHODS AND SYSTEMS FOR IDENTIFYING TRANSMITTED CODEWORDS AFTER LOSS OF SYNCHRONIZATION IN SPREAD SPECTRUM COMMUNICATION SYSTEMS

(75) Inventor: Vladislav A. Oleynik, Chapel Hill, NC (US)

(73) Assignee: Umbrella Capital, LLC, Ft. Lauderdale, FL (US)

( * ) Notice: Subject to any disclaimer, the term of this patent is extended or adjusted under 35 U.S.C. 154(b) by 650 days.

(21) Appl. No.: 09/723,829

(22) Filed: Nov. 28, 2000

(51) Int. Cl.[7] .............................................. H04L 27/30
(52) U.S. Cl. ...................... 375/145; 375/149; 375/359; 375/368; 370/510; 370/512; 370/514
(58) Field of Search .......................... 375/130, 135–137, 375/145, 146, 149, 295, 359, 361, 365, 368, 369; 370/509, 510, 512–514

(56) References Cited

U.S. PATENT DOCUMENTS 4,670,890 A * 6/1987 Titchener .................... 375/359
5,239,557 A * 8/1993 Dent .......................... 370/342
5,835,144 A * 11/1998 Matsumura et al. ... 375/240.23
6,445,719 B1 * 9/2002 Schneider et al. .......... 370/506

* cited by examiner

Primary Examiner—Dac V. Ha
(74) Attorney, Agent, or Firm—Jenkins, Wilson & Taylor, P.A.

(57) ABSTRACT

A method and system for maintaining synchronization and identifying received codewords in a spread spectrum communication system is disclosed. According to the method and system, a spread spectrum transmitter divides information being transmitted into pairs of tetrads. The transmitter then substitutes modulating codes selected from first and second groups of modulating codes for each pair of tetrads. The bit stream consists of codewords alternatingly selected from the first and second code groups. The bit stream does not contain any codes from the first and second groups other than the selected codes in the selected positions. The transmitter modulates a carrier using the modulating codes and transmits the signal to a spread spectrum receiver. The spread spectrum receiver synchronizes itself with the incoming signal and identifies the transmitted information by detecting the alternating sequence of codewords from the first and second code groups.

21 Claims, 11 Drawing Sheets

METHODS AND SYSTEMS FOR IDENTIFYING TRANSMITTED CODEWORDS AFTER LOSS OF SYNCHRONIZATION IN SPREAD SPECTRUM COMMUNICATION SYSTEMS

TECHNICAL FIELD

The present invention relates to spread spectrum communication systems. More particularly, the present invention relates to methods and systems for identifying transmitted codewords after loss of synchronization in spread spectrum communication systems.

RELATED ART

Spread Spectrum Modulation Techniques

In communication systems, such as spread spectrum communication systems, two methods are often used to spread the bandwidth of a transmitted signal over a wide frequency spectrum—direct sequencing and frequency hopping. Both methods of modulation are characterized by broad frequency spectra. When using these methods of modulation, the output signals have a much wider frequency band than the information signal, which is used for modulation of the carrier frequency of the radio signal. For many commercial communication systems, the bandwidth of the carrier frequency is tens to hundreds of times wider than information signal frequency band. Direct sequence is perhaps one of the most widely known spread spectrum communication system and it is relatively simple to implement, in that a narrow band carrier is modulated by a code sequence.

More specifically, the name direct sequence spread spectrum (DSSS) system originates from the fact that this technique uses a high speed spreading code sequence, along with the information being sent, to modulate an RF carrier. The high speed spreading code sequence is used directly to modulate the carrier, thereby directly setting the transmitted RF bandwidth. The most common signal modulation technique used in DSSS systems is known as binary phase shift keyed (BPSK) modulation or quadrature phase shift keyed (QPSK) modulation.

DSSS signals have a noise-like characteristic in the occupied frequency band. The broad bandwidth of the spectrum due to the spreading code allows the transmitted power of DSSS signals to decrease below noise threshold without information loss.

One problem with both DSSS and frequency-hopping spread spectrum communication systems is maintaining synchronization and identifying transmitted codes after loss of synchronization. More particularly, since there is generally no master clock to which spread spectrum transmitters and receivers synchronize, spread spectrum receivers must synchronize with the received spread spectrum signal in order to decode the received spread spectrum signal.

This synchronization has traditionally been accomplished by using a phase-lock-loop to derive the carrier frequency signal from the received signal. However, even though the carrier frequency signal can be derived, it is impossible to identify the transmitted codewords after loss of synchronization because there is no way to determine where one code ends and the next code begins after synchronization has been lost. A conventional solution to this problem of identifying transmitted codewords is utilizing a synchronization preamble at the beginning of each transmitted codeword. However, this solution is undesirable since it decreases throughput and increases the processing circuitry required at the receiver.

Accordingly, there exists a long-felt need for methods and systems for identifying transmitted codewords after loss of synchronization in a spread spectrum communication system without transmitting a synchronization preamble.

DISCLOSURE OF THE INVENTION

The present invention includes a spread spectrum communication system that transforms digital information to be transmitted into codes that facilitate identification of transmitted codewords after loss of synchronization by a spread spectrum receiver. The terms "codes" and "codewords" are used interchangeably herein and are intended to refer to discrete units of information that can be decoded into recognizable data, such as characters.

The present invention maintains synchronization of the receiver based only on the received information signal without using a special synchronizing signal in addition to the information signal. The present invention also allows a spread spectrum receiver to identify transmitted codes after loss of synchronization using special properties of the transmitted information signal. The code identification can be accomplished without transmission and reception of a synchronization sequence, such as a synchronization preamble, added to the information signal.

The spread spectrum communication system includes a spread spectrum transmitter and a spread spectrum receiver, where the synchronization of the high-frequency signal conversion is implemented. The transmitter converts the useful information into a digital sequence, converts the digital sequence into special codes, and converts the resulting code sequence into a spread spectrum type signal for transmission. The spread spectrum receiver receives the spread spectrum signal, self-synchronizes based on the code sequences, and extracts the transmitted information. The code sequence allows the receiver to synchronize the processes of error-free decoding and conversion of the received digital code sequence into the source information.

Accordingly, it is an object of the present invention includes to convert a digital sequence generated by the transmitter according to the information to be transmitted into a special digital code sequence possessing properties that allow synchronization of the receiver and restoration of synchronization of the receiver during the reception of the information.

It is another object of the invention to produce a signal that allows the phase of the received high-frequency signal to be determined and thus to eliminate possibility of incorrect restoration of the information due to incorrectly defined polarity of the impulses of which the received digital codes consist.

It is yet another object of the invention to provide a coding device in the transmitter for generating the necessary code sequence.

It is yet another object of the invention to provide a decoding device which is included in the receiver for converting the code sequence into a digital sequence corresponding to the transmitted information, for obtaining synchronization signals, and for determining the phase of the received high-frequency signal and the polarity of impulses of which received digital codes consist.

It is yet another object of the present invention to provide a method for identifying transmitted codewords at a spread spectrum receiver after loss of synchronization between the transmitter and the receiver without requiring transmission of a synchronization preamble.

Some of the objects of the invention having been stated hereinabove, other objects will become evident as the description proceeds when taken in connection with the accompanying drawings as best described hereinbelow.

BRIEF DESCRIPTION OF THE DRAWINGS

A description of preferred embodiments of the present invention will now proceed with reference to the accompanying drawings of which.

DETAILED DESCRIPTION OF THE INVENTION

Figure 1:
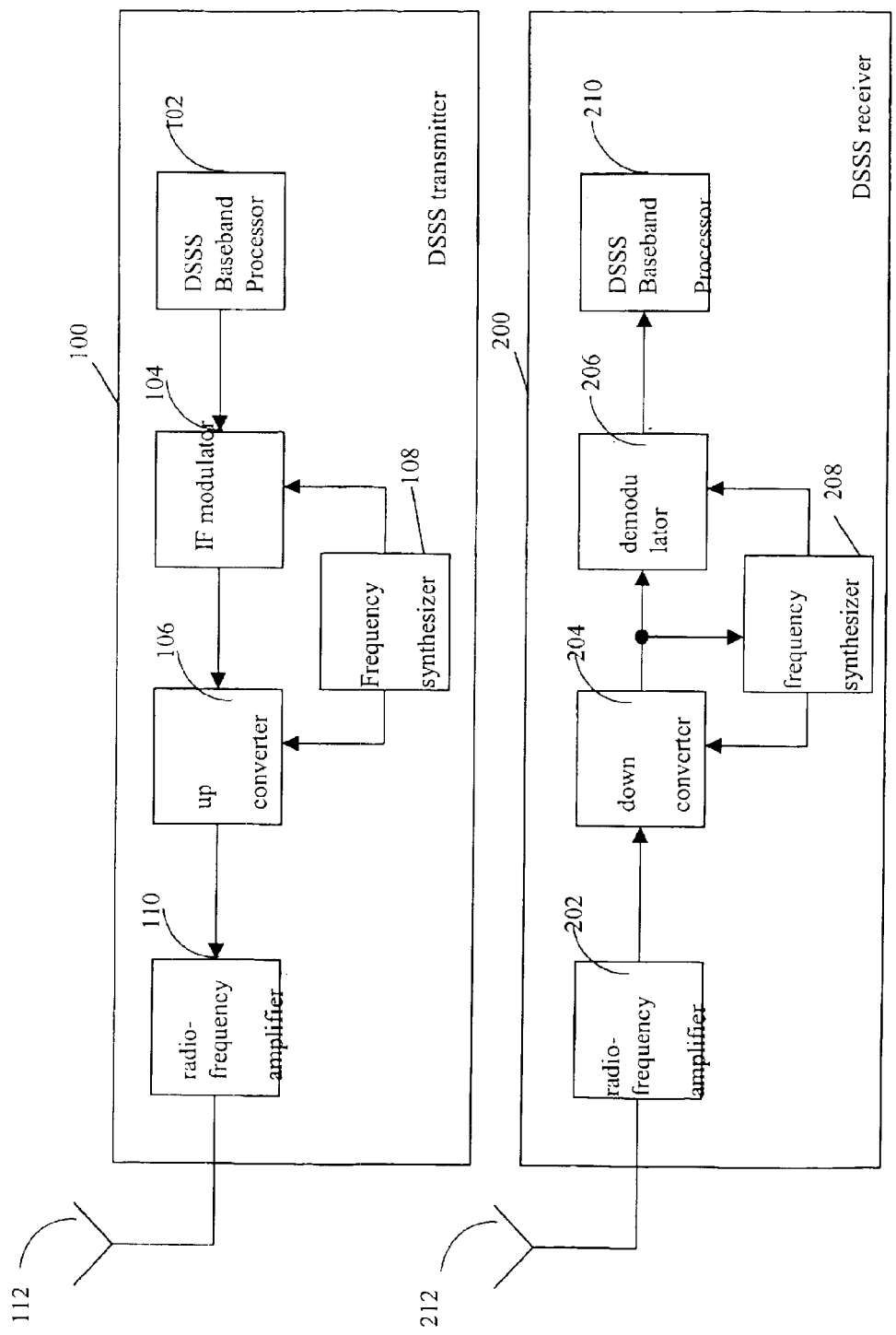
FIG. 1 is a block diagram of a conventional DSSS transmitter and a DSSS receiver.

A simplified example of receiver and transmitter in a spread spectrum communication system is shown at the FIG. 1. The transmitter is denoted by reference numeral 100. In the illustrated embodiment, the transmitter is a DSSS transmitter. DSSS transmitter 100 includes DSSS baseband processor 102, which is designed for processing and conversion of the transmitted digital sequence into a digital sequence of codes that modulate a high-frequency signal. Such codes have conventionally required a synchronization preamble in order to allow the receiver to identify transmitted codewords after loss of synchronization. Transmitter 100 also includes intermediate frequency (IF) modulator 104, which modulates an intermediate frequency signal based on the information signal. Up converter 106 converts the intermediate frequency signal into a carrier signal (radio frequency signal). Frequency synthesizer 108 outputs the carrier and intermediate frequency signals. Transmitter 100 also includes radio-frequency amplifier 110 amplifies the RF signal and outputs the amplified signal to antenna 112.

A simplified example of the receiver 200 of a spread spectrum communication system is also illustrated in FIG. 1. In the illustrated embodiment, receiver 200 comprises a DSSS receiver. Receiver 200 includes an antenna 212 for receiving the transmitted spread spectrum signal and an amplifier 202 for amplifying the signal in the transmitted frequency band. Down converter 204 converts the transmitted signal from the carrier frequency $f_c$ to the intermediate frequency. Demodulator 206 converts the received signal to a baseband sequence of digital codes. Frequency synthesizer 208 outputs the frequencies needed by down converter 204 and demodulator 206. DSSS baseband processor 210 removes the spreading code from the received signal and outputs the transmitted data. If a loss of synchronization occurs, receiver 200 is dependent on the synchronization preamble to identify the next codeword in the transmitted signal.

In DSSS baseband processor circuit 102 of transmitter 100, the original digital data sequence is converted into a sequence of special codes. These codes can be of various types, but the resulting sequences must have a broad spectrum band and noise-like (uniform) distribution of signal power in the occupied frequency band. In addition to the problem of identifying codewords after loss of synchronization, the conventional receiver illustrated in FIG. 1 has difficulty maintaining synchronization due to the effect of phase changes in the received signal on the transmitted information.

Figure 2:
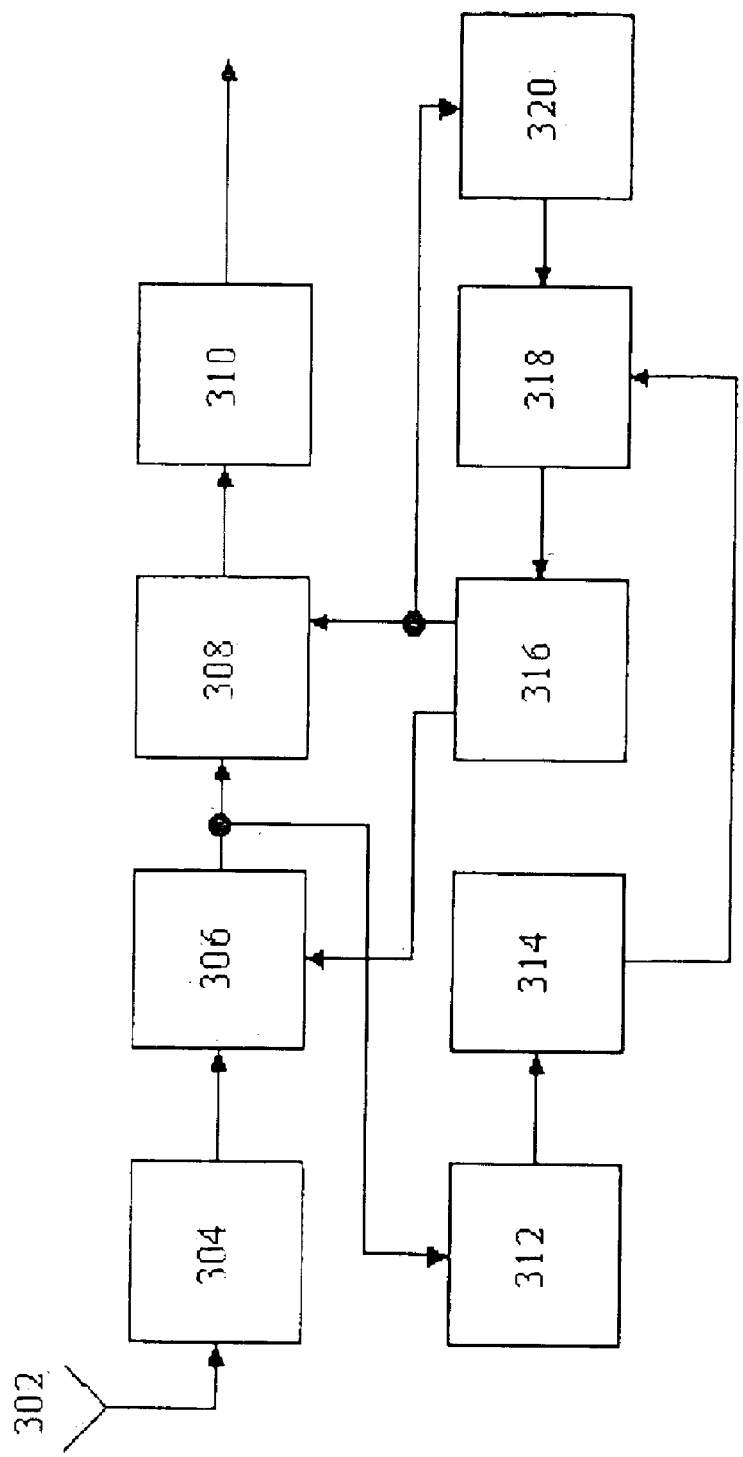
FIG. 2 is a block diagram of a spread spectrum receiver described in a commonly-assigned, co-pending patent application that is capable of achieving phase synchronization based on the received signal and that reduces the effect of phase changes in the received signal on the synchronizing signal.

FIG. 2 is a block diagram of a spread spectrum receiver described in commonly-assigned, co-pending U.S. patent application number 09/591,196 filed Jun. 9, 2000. The receiver illustrated in FIG. 2 avoids the problem of maintaining synchronization by removing the influence of the transmitted information on the received signal. However, even though synchronization can be more reliably maintained than in the conventional receiver illustrated in FIG. 1, identifying codeword boundaries after loss of synchronization is difficult, if not impossible.

In FIG. 2, the receiver includes an antenna 302 for receiving a spread spectrum signal. Preselector 304 is an amplifier that amplifies the spread spectrum signal in the transmitted frequency band. Converter 306 converts the received signal into an intermediate frequency signal. Phase discriminator 308 discriminates the phase of the received spread spectrum signal. Demodulated signal processing module 310 demodulates the signal and outputs the digital data. 4x frequency multiplier 312 multiplies the frequency of the converted spread spectrum signal by four. The purpose of this multiplication is to remove the influence of phase changes in the received signal from the control signal used to synchronize the receiver. Phase rotator 314 rotates the phase of the signal output from 4x frequency multiplier 312. Phase discriminator 318 discriminates the phase of the signal output from module 314 from the phase of the signal output from a comparison signal formation circuit 320. Regulated oscillators module 316 receives the signal output from phase discriminator 318 and outputs signals used to demodulate the received signal.

Synchronization of the DSSS receiver illustrated in FIG. 2 is accomplished in the following manner. The radio frequency signal coming from converter 306 to regulated oscillators module 316 after processing in 4×frequency multiplier 312 is not influenced by phase changes in the received signal. Modules 314, 318, and 320 transform the signal output from 4x frequency multiplier 312 into a form suitable for controlling regulated oscillators module 316. Phase discriminator 318, comparison signal formation circuit 320, and regulated oscillators module 316 form a frequency and phase autotuning device.

Figure 3:
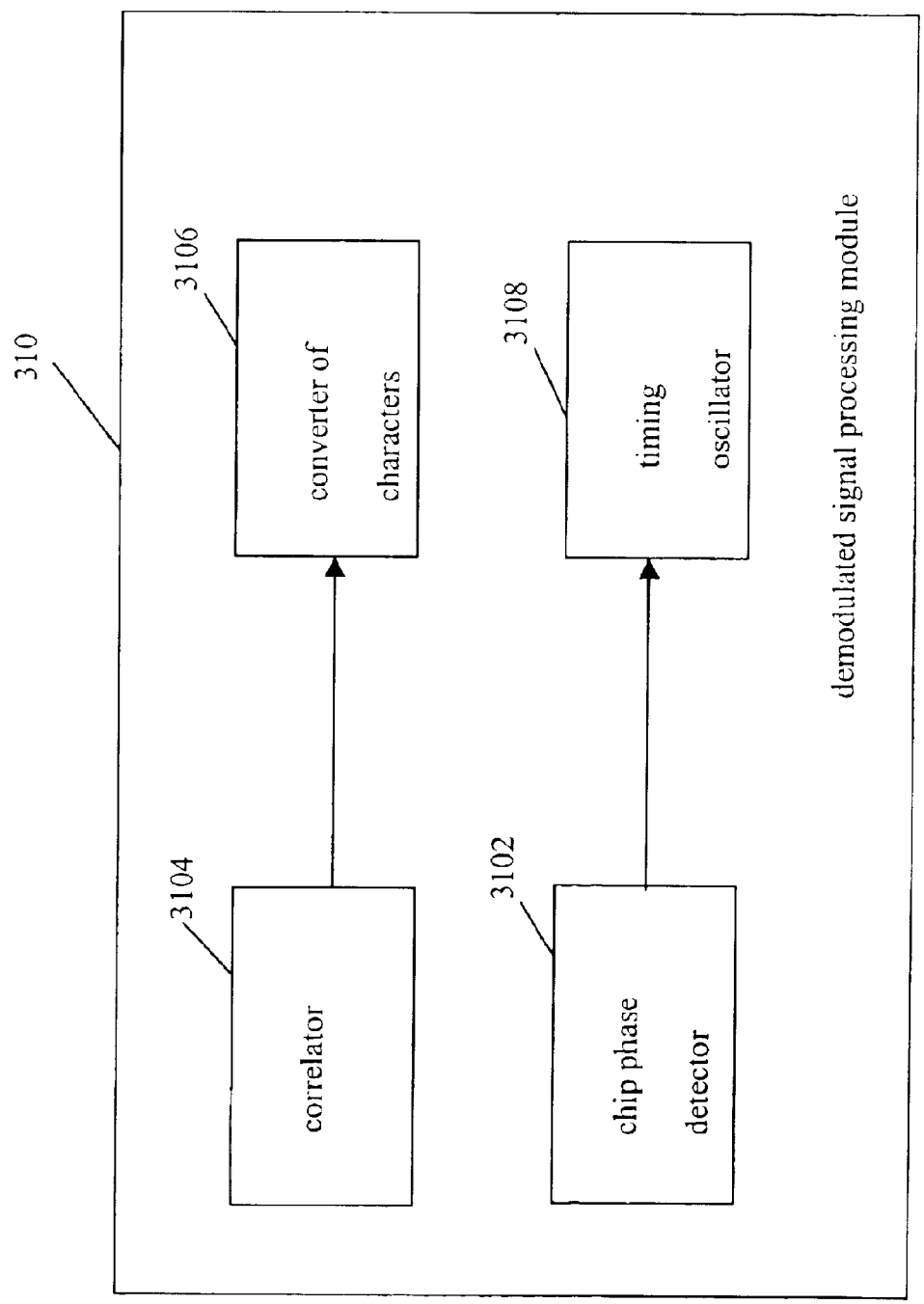
FIG. 3 is a block diagram of a demodulated signal processing module of the spread spectrum receiver illustrated in FIG. 2.
Figure 3A:
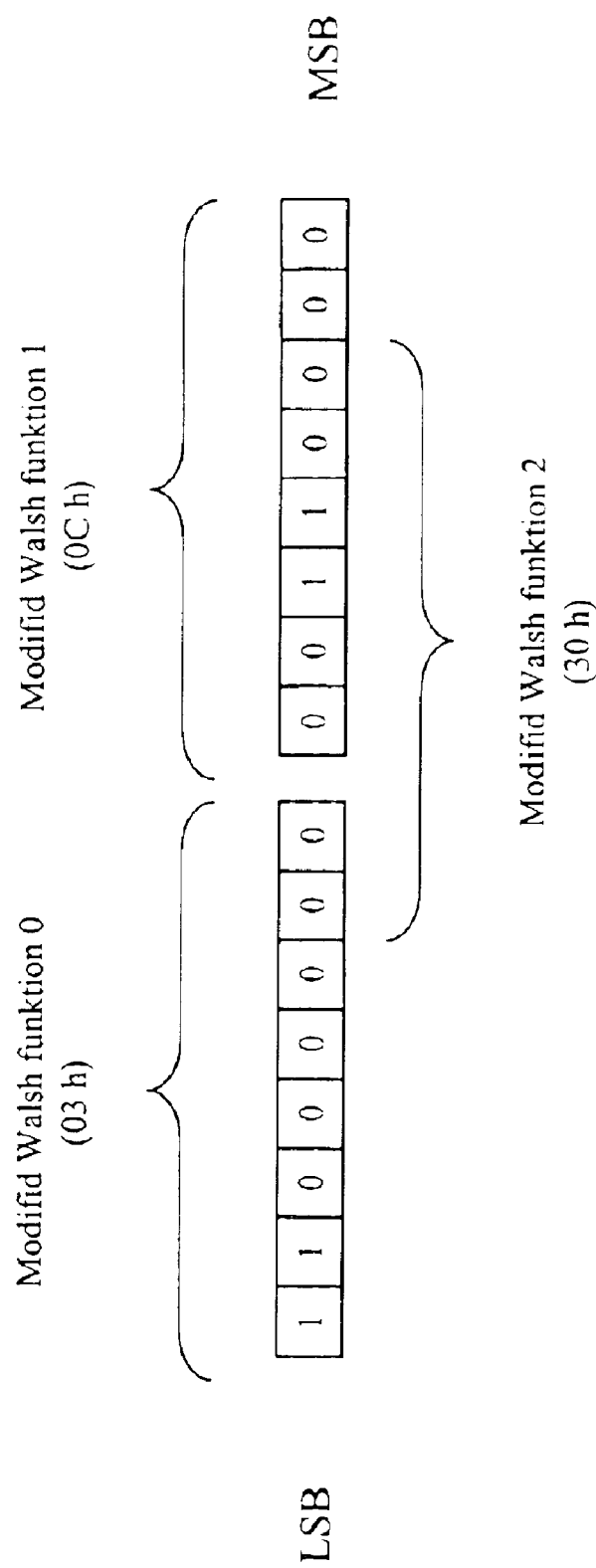
FIG. 3(a) is a block diagram illustrating codes generated using Walsh functions and the potential for coding errors.

While the receiver illustrated in FIG. 2 may be capable of synchronization based on the received signal, resuming normal signal processing in demodulated signal processing module 310 after the loss of synchronization may not be possible without preliminary phasing of demodulated signal processing module 310 with the help of a specific preliminary phasing sequence. More particularly, while it is possible to restore the receiving synchronization of the carrier (IF or RF), after a loss of synchronization by the receiver of FIG. 2, it is impossible to restore the identification of codes in the code sequence because of it is impossible to determine where the beginning of the received code is and where is its end. To achieve receiving synchronization and codes identification, it is necessary to implement synchronization of the receiving process beginning at the moment the first code of the information sequence begins. The beginning of the first code is the reference moment of time to calculate bits of the sequence and to determine the starting point of each of the following sequential codes. In conventional spread spectrum receivers, the synchronization of receiving at the beginning is accomplished preamble as a special code sequence. FIG. 3 is a block diagram illustrating the internal structure of demodulated signal processing 310 of FIG. 2. In FIG. 3, demodulated signal processing module 310 includes chip phase detector 3102, correlator 3104, characters converter 3106, and timing generator 3108. These components are not capable of determining the phase state of separate characters represented by the received sequence codes. After a loss of synchronization, it is only possible to restore the synchronization of individual bits with the help of chip phase detector 3102, but it is impossible to determine what code or character is being received because there is no way to tell where you are within a given character or code. FIG. 3(a) illustrates that if Walsh functions are used it will be impossible to determine the phase state of the received code after synchronization is restored to a receiving carrier. For example, in FIG. 3, modified Walsh function 0 is the code 03 hexadecimal. Modified Walsh function 1 is the code OC hexadecimal. If a bit stream consisting of Modified Walsh function 0 followed by modified Walsh function 1 is transmitted sequentially and synchronization is restored in the middle of reception of this sequence, the receiver may detect modified Walsh function 2, which is contained within this sequence. Thus, using conventional Walsh functions, it is impossible to correctly identify transmitted codes without using a synchronization preamble.

Figure 3B:
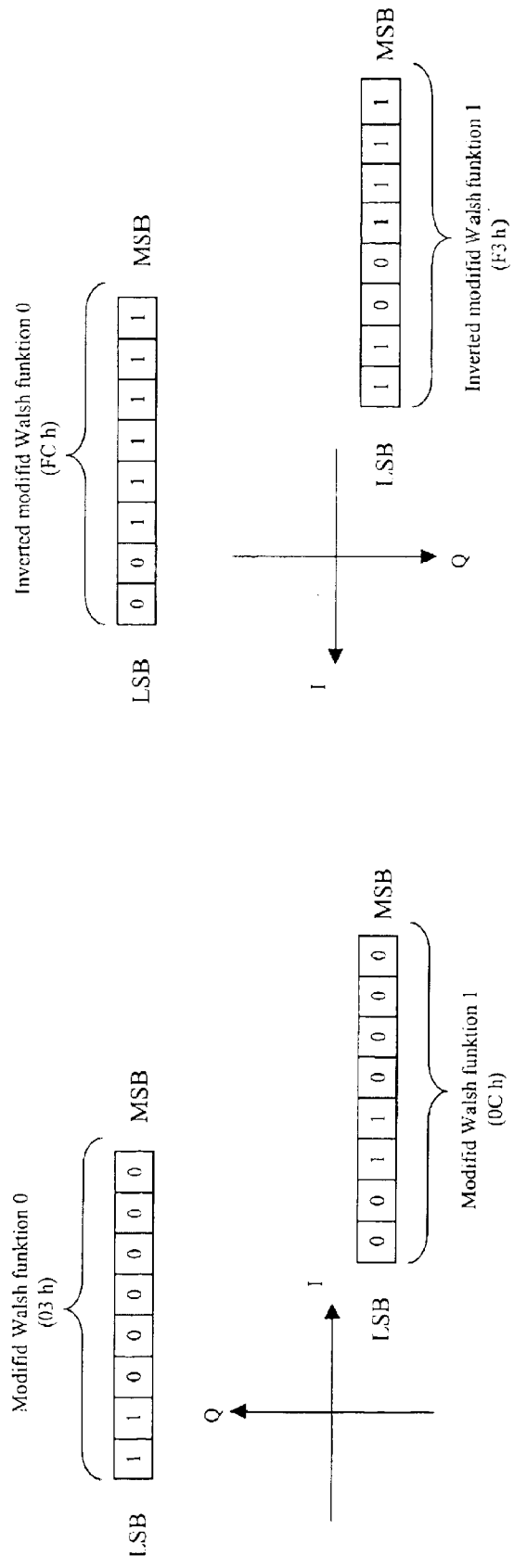
FIG. 3(b) illustrates errors in decoding Walsh functions caused by phase uncertainty at the receiver.

In addition, if different characters of the information sequence are represented by non-inverted and inverted codes having the same shape but different power polarity, after loss of synchronization and subsequent restoration according to radio frequency and separate code impulses, it may not be possible to determine the character correctly due to uncertainty of the code pulse polarity in the original transmitted sequence. For example, after synchronization restoring of the receiving process of the carrier (RF or IF) it will appear to be possible to identify separate pulses in the digital sequence representing the code to be received. However, as stated above, it is impossible to determine where the beginning or the end of the received code is located. Moreover, it is impossible to determine if an inverse or non-inverse code is being received because the phase uncertainty of the carrier receiving synchronization is $\pi/2$. The impossibility of the proper determination of the code sign after synchronization restoring of the receiving process of the carrier, when the phase shift is equal to $\pi$, is shown in FIG. 3(b). In FIG. 3(b), the modified Walsh functions 0 and 1 are correctly received when the receiver is in phase with the carrier. However, when the phase shift between the receiver and the carrier is equal to $\pi$, the received codes will be decoded as the inverse of the originally transmitted codes, illustrated by inverse modified Walsh functions 0 and 1.

Baseband Processor

Figure 4:
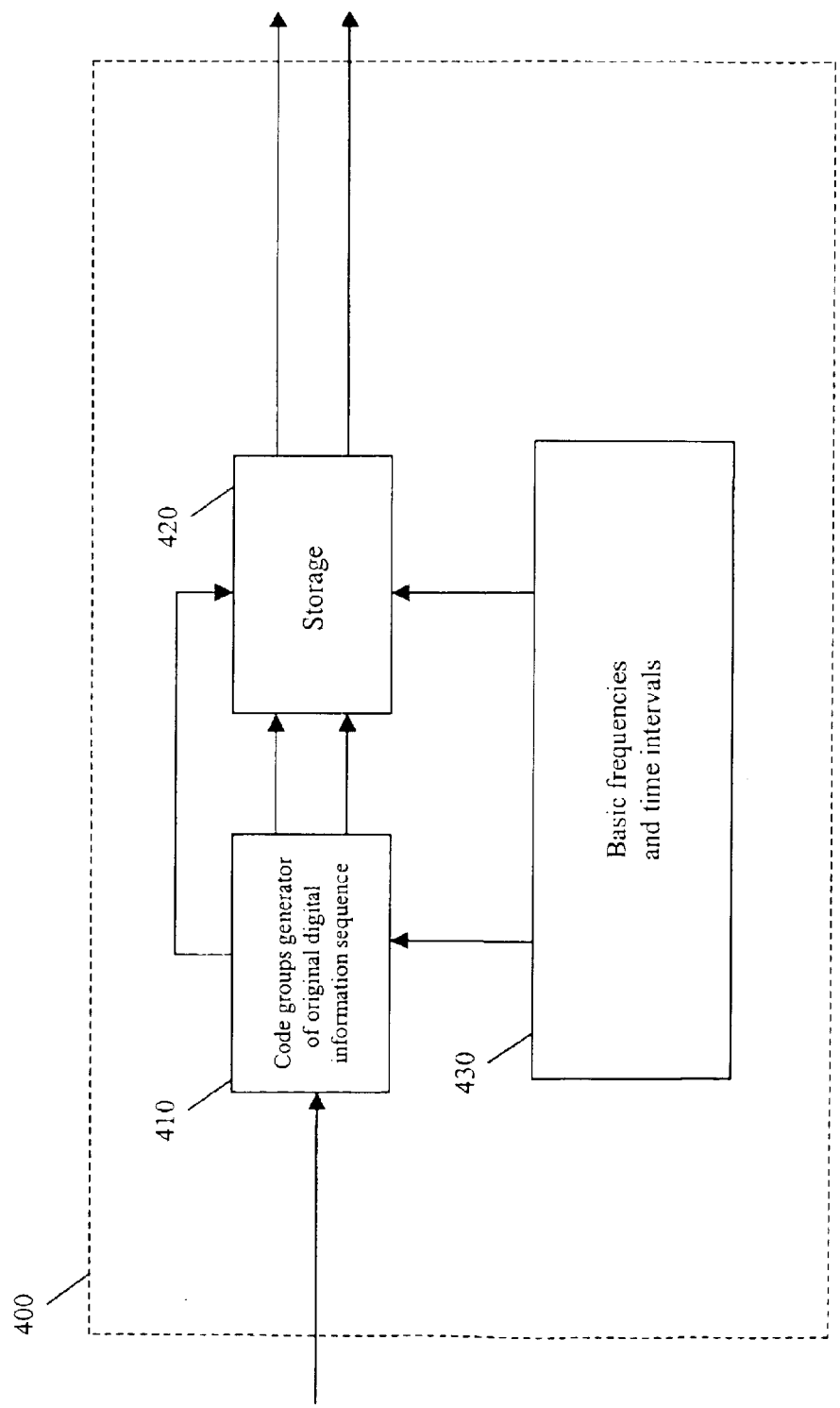
FIG. 4 is a block diagram of a DSSS baseband processor for use in a spread spectrum transmitter according to an embodiment of the present invention.

FIG. 4 is a baseband processor according to an embodiment of the present invention. In FIG. 4, baseband processor 400 can be substituted for baseband processor 102 of transmitter 100 illustrated in FIG. 1. In the illustrated embodiment, baseband processor 400 (illustrated in FIG. 4) includes code groups generator of original digital information sequence 410, storage device 420, and basic frequencies and time intervals module 430. Code groups generator 410 forms code groups from the original digital information sequence for the substitution of those mentioned groups with special codes in the module 420. The codes output from module 420 will form the code sequence having properties that allow the receiver to synchronize the process of correct decoding and conversion of a digital code sequence into the source information, as mentioned above.

In the case under consideration, tetrads of a digital sequence representing the original transmitted information are assumed to be in place of the mentioned code groups of the original digital information sequence. The input information stream is divided into tetrads following each other consecutively. This function is performed in module 410. In this case these tetrads are just code groups of the original digital information sequence. These tetrads are divided into even and odd groups as will be discussed in more detail below. There is no substitution of these formed tetrads to special (modulating) codes in the module 410. That substitution is then executed in the module 420. Each modulating codes output from module 420 consists of 8 bits.

An important aspect of the invention includes codes consisting of 8-bit impulse sequences that are substituted for the tetrads in module 420. As used herein, the term "8-bit impulse sequence" refers to a bipolar signal that consists of 8 elements or 8 impulses wherein each impulse is a separate code bit. Any of these elements or impulses may be positive (digital value equal to "1") or negative (digital value equal to "0").

The total amount of codes generated by module 420 should be equal to 32. The codes should be combined into two groups—so called 'first' and 'second' groups of codes, each having 16 codes in a group. The codes should be constructed or selected in such a manner that being placed in a sequence consisting of codes from different groups following one another, it would be impossible to encounter a sequence of impulses (except in a place occupied by any given pair of codes, in which a code from the first group is followed by a code from the second group), formed by one code following another code, a 16-bit sequence being a code and equal to any code resulting from concatenation of two codes going one after the other, the first being arbitrarily selected from the first group, and the second from the second group of codes. For example, given a bit sequence consisting of a codeword from the first group followed by a codeword from the second group, none of the codewords other than the concatenated codewords appear within the bit sequence. For example, if a transmitted code sequence is 110110101111101111011010 (code 0 from the first group followed by code 0 from the second group and followed by code 0 from the first group) or this sequence: 111110111101101011111011(code 0 from the second group followed by code 0 from the first group and followed by code 0 from the second group), then it is impossible to find in this sequence such a 16-bit sequence of two codes in which any code from the first group is followed by any code from the second group, with the exception of sequence 1101101011111011 (code 0 from the first group followed by code 0 from the second group). An example of codes with the properties described above is shown in Table 1.

TABLE 1

Modulating Codes

| Code number | Code (hexadecimal) | Bit sequence Least Significant Bit . . . Most Significant Bit |
|---|---|---|
| First Code Group | | |
| 0 | 5B | LSB 11011010 MSB |
| 1 | AB | 11010101 |
| 2 | 64 | 00100110 |
| 3 | 97 | 11101001 |
| 4 | 3D | 10111100 |
| 5 | 9D | 10111001 |
| 6 | 01 | 10000000 |
| 7 | B3 | 11001101 |
| 8 | 4A | 01010010 |
| 9 | 9C | 00111001 |
| 10 | 3C | 00111100 |
| 11 | 22 | 01000100 |
| 12 | AC | 00110101 |
| 13 | 5C | 00111010 |
| 14 | 96 | 01101001 |
| 15 | 60 | 00000110 |
| Second Code Group | | |
| 0 | DF | 11111011 |
| 1 | A1 | 10000101 |
| 2 | EF | 11110111 |
| 3 | 1F | 11111000 |
| 4 | 21 | 10000100 |
| 5 | 5F | 11111010 |
| 6 | 81 | 10000001 |
| 7 | 41 | 10000010 |
| 8 | 71 | 10001110 |
| 9 | F1 | 10001111 |
| 10 | 6F | 11110110 |
| 11 | AF | 11110101 |
| 12 | A8 | 00010101 |
| 13 | C1 | 10000011 |
| 14 | 28 | 00010100 |
| 15 | E8 | 00010111 |

The values of special codes, examples of which are shown in Table 1, are stored in a storage device 420, in accordance with the diagram of the baseband processor implementation of a transmitter being considered. Hereinafter, the above-described eight-bit codes will be referred to as "modulating codes" or MCs according to their use for signal modulation of the intermediate frequency in an IF-modulator.

The original digital information sequence is input to code groups generator 410 of baseband processor 400. In code groups generator 410, the digital information sequence is transformed into consecutive even and odd pairs of tetrads. For example, an input bit stream of 0000000100100011 is divided into a first pair consisting of tetrads 0000 and 0001 and a second pair consisting of tetrads 0010 and 0011. The first tetrad from each pair is output from the first output of module 410 to the first input of module 420, and generates an MC from the first or second code groups output through the first output of module 420, which is also the first output of baseband processor 400. The second tetrad from each pair is output from the second output of module 410 to the second input of module 420 and generates an MC from the first or second code groups output through the second output of module 420, which is also the second output of baseband processor 400. The choice of MC group is made in accordance with the value of the signal going from the third output of module 410 to the third input of module 420. In this connection, the tetrads from any even pair of tetrads lead to the choice of MCs from the first code group, and tetrads from any odd pair of tetrads lead to the choice of MCs from the second code group.

The signals from the first and second outputs of baseband processor 400 are predetermined for transmitter signal modulation in the IF modulator.

Figure 5:
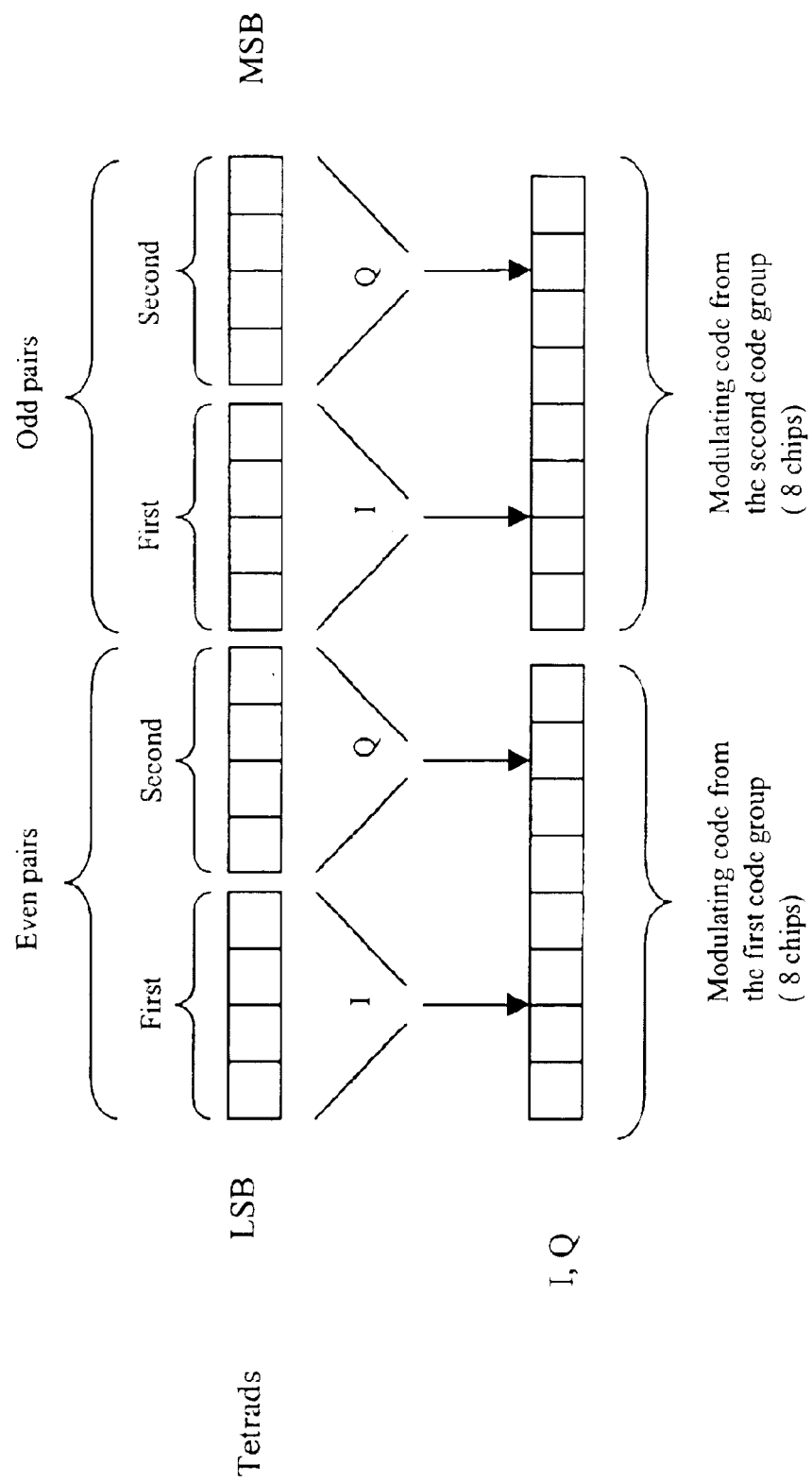
FIG. 5 is a block diagram illustrating a method for selecting modulating codes based on the information stream in a spread spectrum transmitter according to an embodiment of the present invention.

The algorithm for substitution of the tetrads generated from the input information sequence by MCs is explained by the diagram shown in FIG. 5. This diagram is based upon the assumption that the first output of baseband processor 400 is connected to the I-input of a quadrature phase IF-modulator, such as IF-modulator 104 illustrated in FIG. 1, and the second output of the indicated processor is connected to the Q-input of the quadrature phase-IF modulator of the transmitter. In FIG. 5, the first and second tetrads from each even pair of tetrads is used to select a modulating code from the first code group illustrated in Table 1. The first and second tetrads from each odd pair of tetrads is used to select a modulating code from the second code group.

Referring back to FIG. 4, basic frequencies and time intervals module 430 is designed to generate the clock signal necessary to support the operation of modules 410 and 420. The signals generated by module 430 are input to synchronization inputs of modules 410 and 420 through the first and second outputs of module 430.

Figure 6:
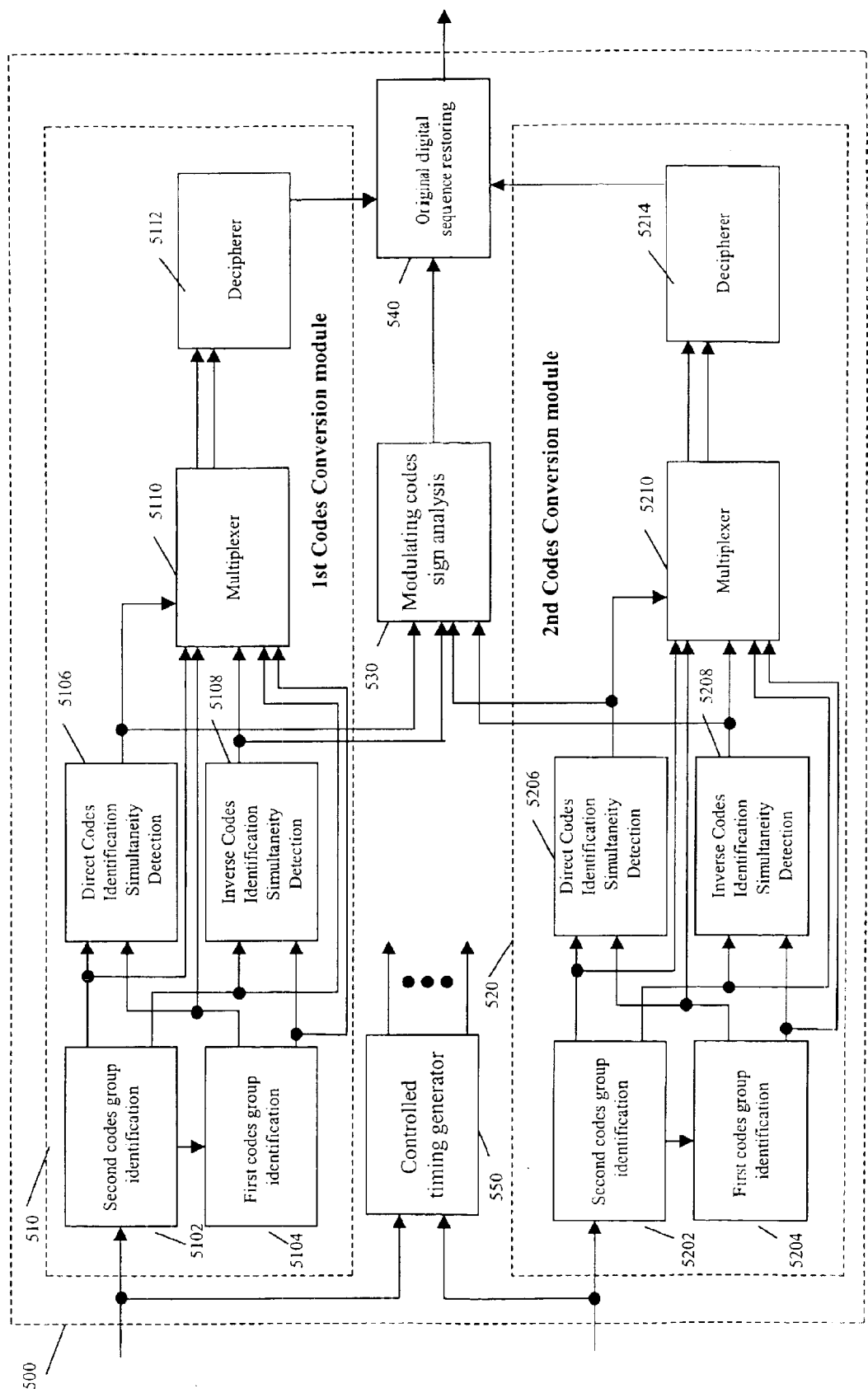
FIG. 6 is a block diagram of a DSSS baseband processor including synchronization circuitry suitable for use in a spread spectrum receiver according to an embodiment of the present invention.

FIG. 6 shows a block diagram of one of the possible implementations of a DSSS baseband processor of a receiver. Such a DSSS baseband processor may be substituted for DSSS baseband processor 210 of receiver 200 illustrated in FIG. 1. In FIG. 6, DSSS baseband processor 500 comprises 1st codes conversion ($1^{st}$ CC) module 510, 2nd codes conversion ($2^{nd}$ CC) module 520, modulating codes sign analysis (MCSA) module 530, original digital sequence restoring (OSR) module 540, and controlled timing generator (CTG) 550.

The demodulated signals from the MC impulse sequences, which are decoded in an IF demodulator of a spread spectrum receiver, are input to 1st CC module 510 and $2^{nd}$ CC module 520, respectively. CC module 510 is designed for detection of MC pairs in the input sequence of impulses. In each pair of MCs, the first MC belongs to the first group of codes, and the second MC belongs to the second group of codes.

CC module 510 comprises $1^{st}$ code group identification ($1^{st}$ CGI) module 5104, $2^{nd}$ code group identification ($2^{nd}$ CGI) module 5102, direct codes identification simultaneity detection (DCISD) module 5106, inverse codes identification simultaneity detection (ICISD) module 5108, multiplexor 5110, and decipherer 5112.

The input of CC module 510 is connected to the input of $2^{nd}$ CGI module 5102, the third output of which is connected to the input of the $1^{st}$ CGI module 5104. The values of MCs from the second code group are stored in the storage device of module 5102, and the values of modulating codes from the first codes group are stored in the storage device of module 5104.

The input sequence of impulses first passes through module 5102, where it is compared with MCs from the second group. The input sequence then passes through module 5104, where it is compared with MCs from the first group. After the detection of complete coincidence between an input sequence of impulses and one of the values of a MC stored in modules 5102 or 5104, a detection signal appears on the first output of module 5102 or 5104. The output indicates the number of the MC in the group of codes, within which the coincidence occurred. After the detection of coincidence between an input sequence and the inverse code, a detection signal also appears on the second output of the module 5102 or 5104. An inverse code is an inverse MC of the first or second group. For example, the inverse code for MC 0 (11011010 or 5B h) from the first group is equal to 00100101 (A4 h). It is possible for an inverse MC to appear on the input of the DSSS baseband processor module 500 after the loss and subsequent restoration of synchronization of carrier receiving due to phase uncertainty. The least common multiple of the phase uncertainty is equal to $\pi/2$. In addition, exchange of the in-phase and quadrature channels will occur in the quadrature IF demodulator for phase shifts of $\pi/2$ or $3\pi/2$. Thus, proper identification of inverse MC allows the source information to be restored without errors.

The detection signals appearing on the first and second outputs of module 5102 or 5104 can be, for example, positional codes. Here the term positional code means a code whose value is determined by the position of the "1" bit in the byte. For example, byte 04 h is equal to 2 because the "1" bit is in the second position from the right; byte 08 h is equal to 3 because the "1" bit is in the third position from the right; and byte 10 h is equal to 4 because the "1" is in the fourth position from the right.

It is necessary to note that direct or inverted impulse sequences can go to inputs of the DSSS baseband processor 500, depending on the phase the receiver is in when receiving, in relation to the phase of the received signal. The first outputs of modules 5102 and 5104 are connected to inputs of the DCISD module 5106. If the detection signals go to the inputs of DCISD module 5106 from the first outputs of modules 5102 and 5104 simultaneously, then module 5106 generates an impulse signal of MCs coincident with the first and second code groups, which goes from the output of module 5106 to the first control input of the multiplexor 5110. The output of module 5106, being the first output of code conversion module 510, is also connected to the first input of MCSA module 530. Thus, the coincidence signal is generated if there is a simultaneous detection of the MC from the first group of codes during the passing of an input impulse signal through module 5104 and the MC from the second group of codes during the passing of an input impulse signal through module 5102. Therefore, the generating of a coincidence signal by module 5106 indicates the detection of a pair of MCs, so that the first code from the pair coincides with the MC from the first group of codes, and the second code from the pair coincides with the MC from the second group of codes.

Detecting a pair of codes—one from the first group and one from the second group—allows determination of where the beginning and end of the next code of the continuous sequence is, in other words, to synchronize receiving and identification of the codes.

The second outputs of modules 5102 and 5104 are connected to the inputs of ICISD module 5108. When detection signals are input to the inputs of the module 5108 from the second outputs of modules 5102 and 5104 simultaneously, module 5106 generates an impulse signal of coincidence between MCs from the first and second groups of codes, which goes from the output of the module 5106 to the second control input of the multiplexor 5110. The output of the module 5108, being the second output of the codes conversion module 510 is connected also to the second input of the MCSA module 530. Module 5108 operates similarly to module 5106 with the exception that module 5108 generates a coincidence signal determining the detection of a pair of inverse MCs. The first outputs of module 5102 and module 5104 are connected to the first and second information input of the multiplexor 5110 respectively, and the second outputs of module 5102 and module 5104 are connected to the third and fourth information input of the multiplexor 5110. In response to a coincidence signal output from module 5106, multiplexor 5110 connects its first and second information inputs to the first and second outputs accordingly, through which identification signals from the first outputs of modules 5102 and 5104 go to the first and second inputs of decipherer 5112 accordingly. In response to a coincidence signal output from module 5108, multiplexor 5110 connects its third and fourth information inputs to the first and second outputs accordingly, through which identification signals from the second outputs of modules 5102 and 5104 go to the first and second inputs of decipherer 5112, accordingly. Thus, either pairs of identified direct MCs or pairs of identified inverse MCs can go to the inputs of the decipherer 5112 depending on the state of phasing the receiver is in when receiving, in relation to the phase of the received signal, as mentioned above. The "state of phasing of the receiver" refers to a phase ratio between the signal of the frequency synthesizer 208 and the received RF signal after the restoration of synchronization of carrier (RF or IF) receiving.

The number of the identified MCs in the code groups does not depend on what impulse sequence (direct or inverse) represents a pair of the identified MCs. Passing through decipherer 5112, the pair of the identified MCs is substituted by the corresponding pairs of tetrads, which, through the output of the decipherer 5112, being the third output of codes conversion module 510, go to the first input of original digital sequence restoring module 540.

The second codes conversion module 520 operates similarly to the first codes conversion module 510, but the first output of the module 520 is connected to the third input of the module 530, the second output of module 520 is connected to the fourth input of module 530, and the third output of module 520 is connected to the second input of module 540.

MCSA module 530 generates a control signal in order to correctly restore the original digital information sequence in module 540. The need for a module with the functionality of module 530 in the DSSS baseband processor 500 can be explained as follows: In the case when the phasing of the receiver is uncertain relative to the received signal phase, it is possible to pass the information transmitted through different channels of the quadrature phase IF-modulator 104 of transmitter 100 through the given channels of quadrature phase IF-demodulator 206 of the receiver.

This way there is a possibility of incorrect decoding of the information. In order to restore the input digital information sequence correctly, the following operations are performed in the module 530: The first and third inputs of the MCSA module 530 receive coincidence signals from DCISD modules 5106 and 5206, which are included into the structure of the first and second code conversion modules 510 and 520, respectively. The second and fourth inputs of MCSA module 530 receive the coincidence signals from ICISD modules 5108 and 5208, included into the structure of the first and second conversion modules 510 and 520, respectively.

When coincidence signals appear simultaneously from DCISD modules 5106 and 5206, and from ICISD modules 5108 and 5208, a sign for the paired coincidence of identified MC signals is generated in the first and the second code conversion modules. This signal goes to the third input of OSR module 540 through the output of the module 530. In this case, pairs of tetrads going to the first and the second inputs of OSR module 540 from the outputs of decipherers 5114 and 5214, accordingly, are placed into the information sequence in such a manner that the first tetrad from the pair of tetrads received from decipherer 5114 is placed at the first position, the first tetrad from the second pair of tetrads received from the decipherer 5214 is placed at the second position, the second tetrad from the pair of tetrads received from the decipherer 5114 is placed at the third position, and the second tetrad from the pair of tetrads received from the decipherer 5214 is placed at the fourth position in a continuous sequence which represents the restored original digital information.

When coincidence signals appear simultaneously from the DCISD module 5106 and the ICISD module 5208 as well as from the ICISD module 5108 and the DCISD module 5206, a sign for the non-coincidence of paired identified MC signals is generated in the first and second code conversion modules. This signal goes through the output of the module 530 to the third input of the OSR module 540 using the same communication line as the coincidence signal but having inverse polarity. These pairs of tetrads going to the first and second inputs of the OSR module 540 from the outputs of decipherers 5114 and 5214, respectively, are placed into the information sequence in such a manner that the first tetrad from a first pair of tetrads received from the decipherer 5114 is placed at the second position, the first tetrad from a second pair of tetrads received from decipherer 5214 is placed at the first position, the second tetrad from the first pair of tetrads received from decipherer 5114 is placed at the fourth position, and the second tetrad from the second pair of tetrads received from the decipherer 5214 is placed at the third position in a continuous sequence which is the decoded original digital information.

The method of transferring both coincidence and non-coincidence of the sign of the pairs identified MC signals can differ from that described above and shown as an example if the effects of these signals lead to the result outlined in this description. For example, the link between the module 530 and the module 540 can be represented by two physical lines, along which the above-mentioned sign of signal coincidence and non-coincidence are transmitted.

Figure 7:
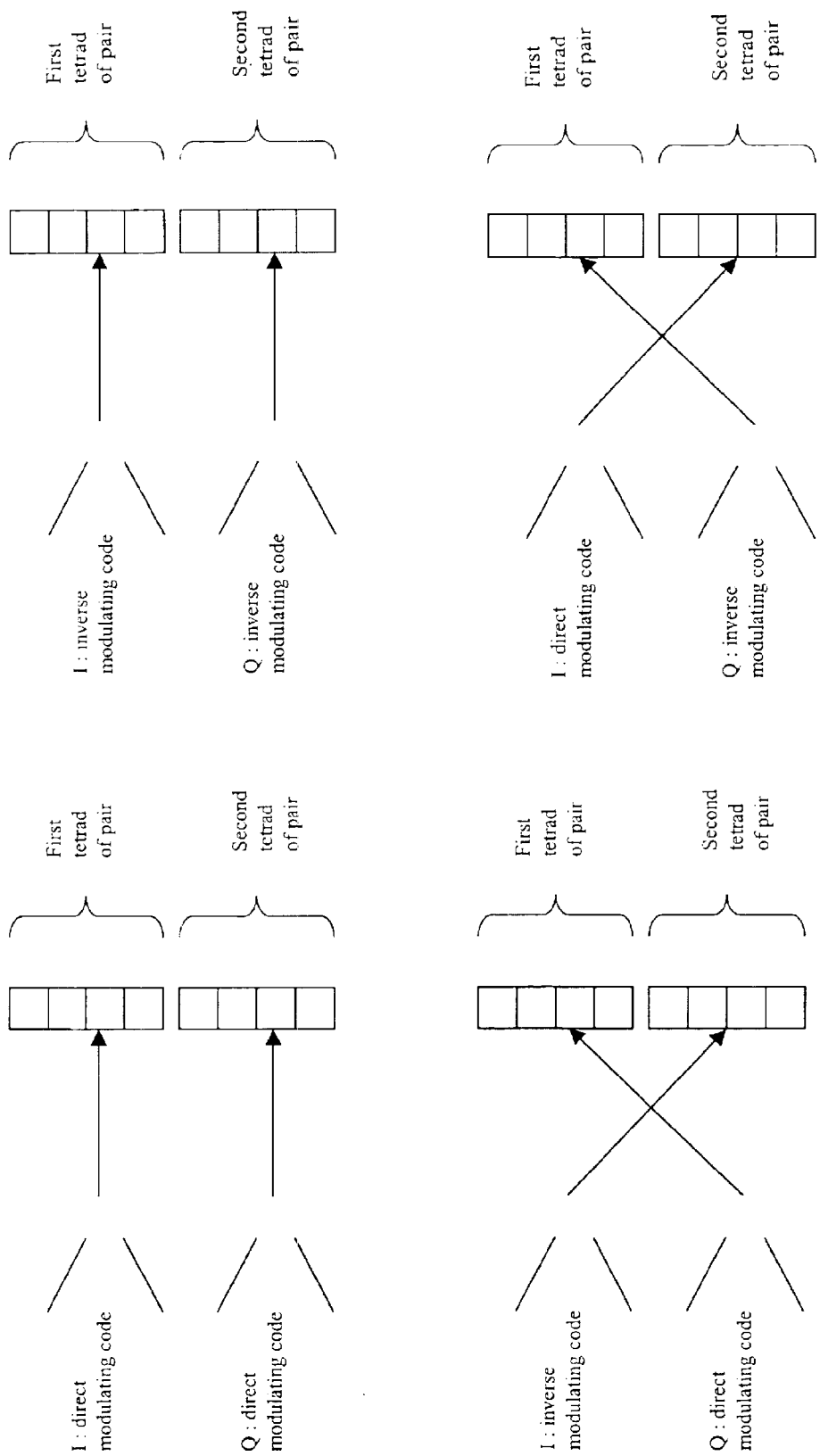
FIG. 7 is a block diagram illustrating the sequencing of information in the original information stream performed by a spread spectrum receiver according to an embodiment of the present invention.

The process of original digital information sequence restoration is illustrated by FIG. 7, which assumes that the first input of DSSS processor 500 is connected to the I-channel, and the second input is connected to the Q-channel of quadrature phase IF-demodulator 206 illustrated in FIG. 1. In FIG. 7, if both the I and Q signals are determined to be direct modulating codes, then the bits from the I-channel are placed in the first tetrad of the tetrad pair and the bits from the Q channel are placed in the second tetrad of the tetrad pair. Similarly, if both the I and Q signals are determined to be inverse modulating codes, then the bits from the I-channel are placed in the first tetrad of the tetrad pair and the bits from the Q channel are placed in the second tetrad of the tetrad pair. If the I signal is determined to be an inverse modulating code and the Q signal is determined to be a direct modulating code, then the bits from the Q channel are placed in the first tetrad of the pair and the bits from the I channel are placed in the second tetrad of the pair. Finally, if the I signal is determined to be a direct modulating code and the Q signal is determined to be an inverse modulating code, then the bits from the Q channel are placed in the first tetrad of the pair and the bits from the I channel are placed in the second tetrad of the pair. In this manner, the receiver reliably orders received data regardless of phase uncertainty.

The output of the module 540 is also the output of DSSS baseband processor 500, through which the restored original digital information can go to a peripheral.

Referring back to FIG. 6 controlled timing generator (CTG) 550 is designed for generating a clock frequency signal to synchronize modules of the DSSS baseband processor 500, and also for generating a frequency tuning signal. The description of the CTG 550 is given below within an example of implementation of DSSS processor 500.

The value of the frequency of the timing generator of the CTG 550 should be several times higher than the inverse value of the duration of one chip of an MC impulse sequence:

$$F_0 = n * 1/t_i,$$

where 'n' is a multiplier indicating by how many times the basic frequency is greater than the chip frequency and depends on the desired accuracy of time intervals generated by module 550. Thus, the number of cycles of the generator during passage of one chip of a MC is equal to 'n', and the number of cycles of the generator during passing the whole MC is equal to 8*n.

In the given example of the module 550, the state of an MC element in code group identification modules 5102, 5104, 5202, and 5204 is determined after n/2 cycles since the beginning of a MC element. The sampling period is equal to 'n' cycles of the timing generator. The timing generator generates the signal that controls sample/hold process of an input impulse sequence received from the IF-demodulator.

It is assumed under the condition described above that samples are equidistant from the beginning and the end of a MC element. The sampling time can be equal, for example, to one half of the timing generator cycle. Such samples can be made, for example, by sample and hold circuit in code group identification modules 5102, 5104, 5202, and 5204. The sample and hold control signal goes to the sampling control inputs of modules for codes group identification 5102 and 5202.

After every $n^{th}$ cycle, the shift signal is sent to control inputs of all CGI modules through communication lines, which are not shown in FIG. 6 for simplicity. When the shift signal is received by the CGI modules, the MCs are shifted in these modules, the values of which are written to 8-bit shift registers. The value received from the current sampling is written to the LSB of the registers of CGI modules 5102 and 5202, and the MSB value of the registers of CGI modules 5102 and 5202 at the moment of shift, is written to the LSB of the registers of CGI modules 5104 and 5204, accordingly.

Thus, the "movement" of MC values occurs from the least significant bits of the shift registers of identification modules 5102 and 5202 to the most significant bits of the shift registers of identification modules 5104 and 5204, accordingly. The moments of sampling are equidistant in time between the shift moments.

Periodically, before the end of an estimated time interval equal, for example, to the prospective time of passing of an MC pair, the expectation of the closest in time change of the signal value is made. These signals are inputs for DSSS baseband processor 500 and go from the IF-demodulator to the inputs of module 550. At the moment any signal value change appears, the counter-synchronization of the CTG module 550 is applied, for example, by reset. This way the controlled timing generator 550 is synchronized. Also, in the module 550, signals are generated to synchronize the operation of all devices included in the structure of DSSS baseband processor 500. Communication lines for propagation of specified synchronization signals are not shown in FIG. 6 for simplicity.

For implementation in the example of module 550, stability of the timing generator should not be worse than the value
1/(32*n+1).

It is possible to realize the process of frequency and phase tuning of the CTG module 550 by well-known methods that are not considered in the given description.

Figure 8:
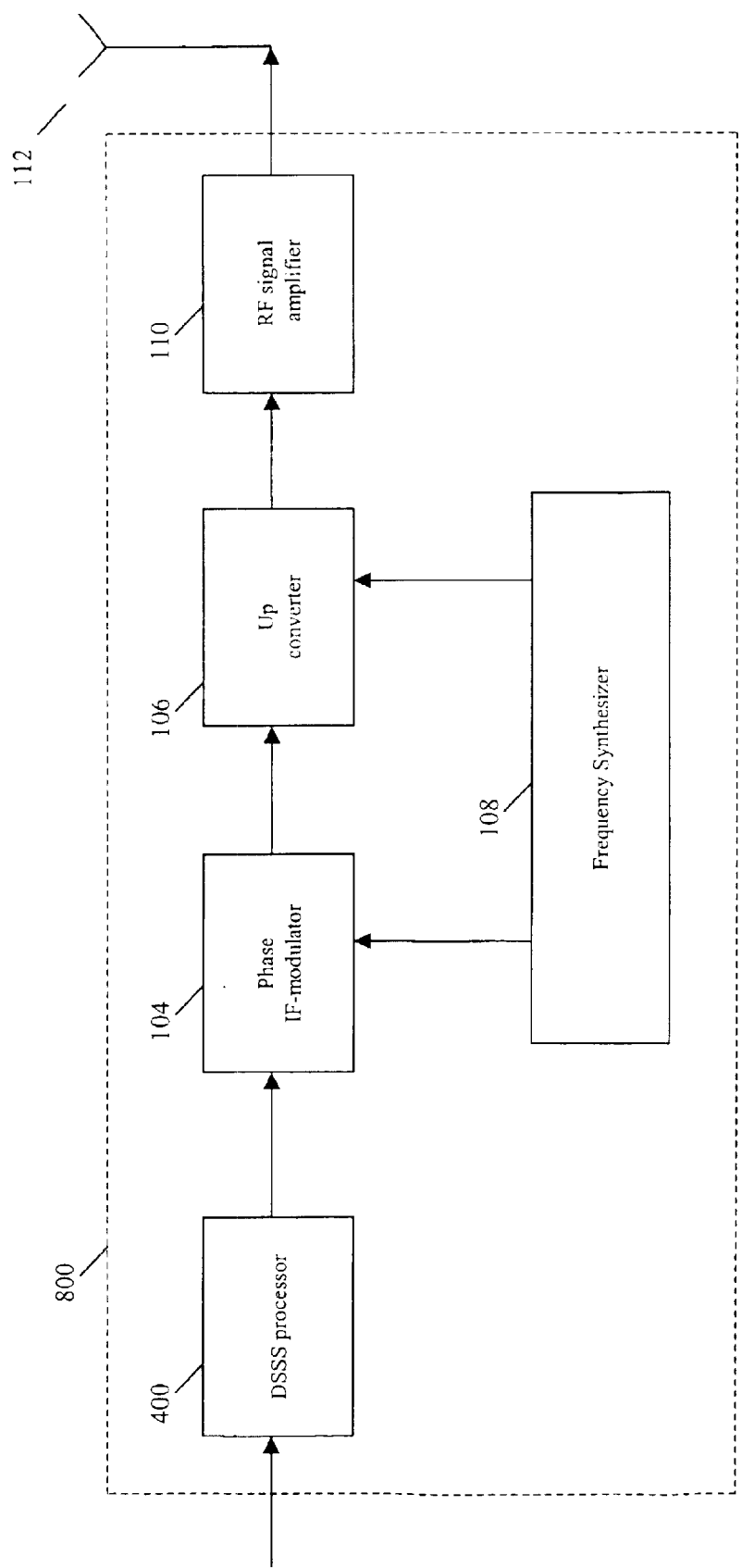
FIG. 8 is a block diagram of a spread spectrum transmitter including the DSSS baseband processor of FIG. 4 according to an embodiment of the present invention.

FIG. 8 is a block diagram of a spread spectrum transmitter including a DSSS baseband processor for formulating modulating codes according to an embodiment of the present invention. The correspondingly numbered components in FIG. 8 are the same as those described above with respect to FIG. 1. Hence, a description thereof will not be repeated herein. Referring to FIG. 8, transmitter 800 includes DSSS baseband processor 400, described above with respect to FIG. 4, phase IF-modulator 104, the first input of which is connected to the output of DSSS processor 400, up converter 106, the first input of which is connected to the output of the phase IF-modulator 104, RF signal amplifier 110, the input of which is connected to the output of converter 106, and the output of which is connected to antenna 112, frequency synthesizer 108, the first output of which is connected to the second input of the phase IF-modulator 104, and the second output is connected to the second input of converter 106.

The signal, which is an MC impulse sequence, goes from the output of DSSS baseband processor 400 to the phase IF-modulator 104, where the IF signal going from the frequency synthesizer 108 is modulated. Phase IF-modulator 104 can be made according to a standard circuit, for example, on Gilbert cells. If the circuit organization of the phase IF-modulator has two quadrature channels, then the link between the DSSS baseband processor 400 and the phase IF-modulator 104 is represented by two physical lines. The first output of the DSSS baseband processor 400 is connected to the input of one of the channels, and the second output is connected to the input of another channel of phase IF-modulator 104.

From the output of phase IF-modulator 104 a signal goes to the input of converter 106, where under the effect of a heterodyne frequency signal, going from the frequency synthesizer 108, the IF signal is converted to an RF signal. Such a conversion can be done in usual ways, for example, by a multiplication of IF signals and a heterodyne frequency in a standard signal multiplier. The signal from the output of up-converter goes to the input of the RF signal amplifier 110, where amplification and matching of the signal is made for transmission through antenna 112. The amplifier 110 also includes circuits for filtering and matching with the antenna.

Figure 9:
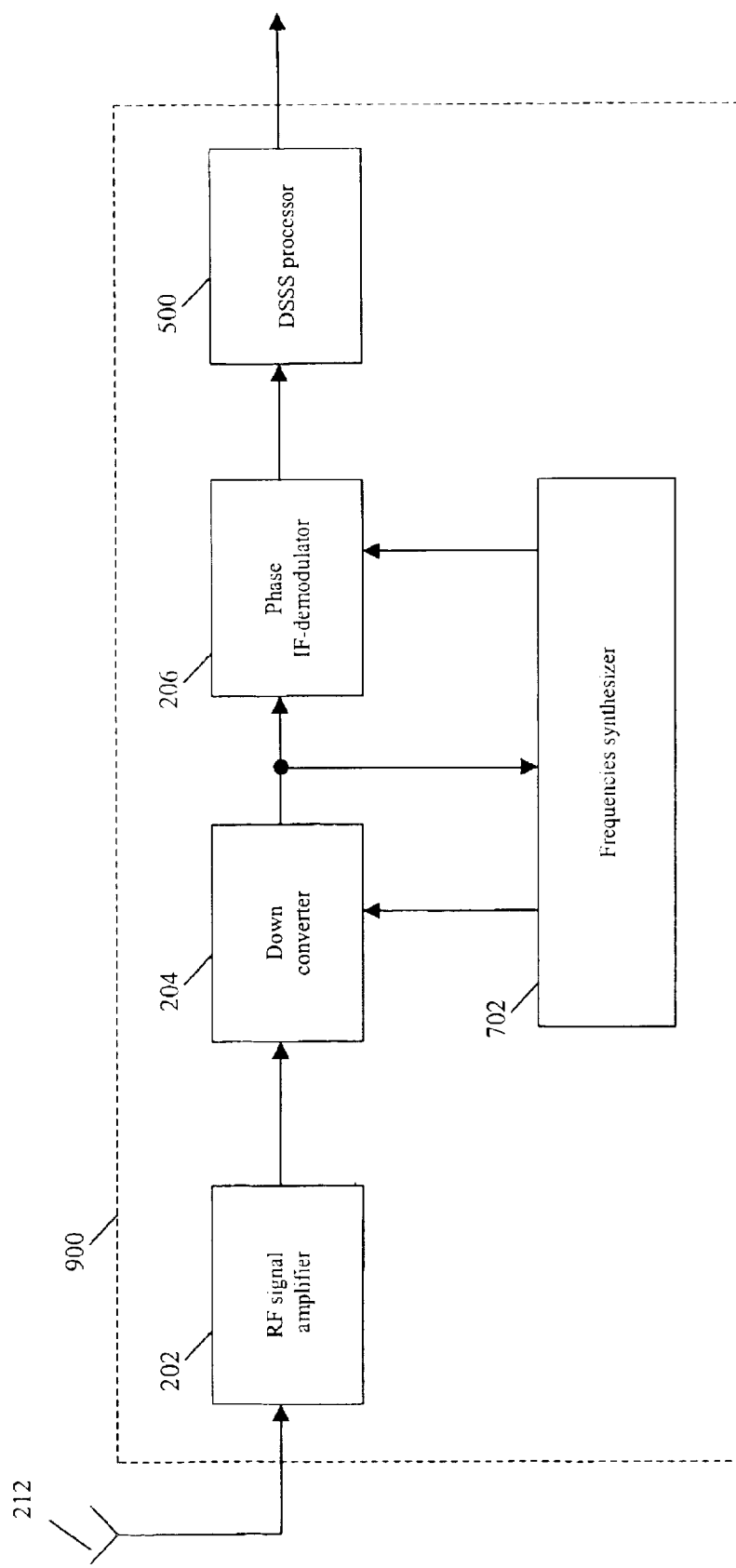
FIG. 9 is a block diagram of a spread spectrum receiver including the DSSS baseband processor of FIG. 6 according to an embodiment of the present invention.

FIG. 9 is a block diagram of a spread spectrum receiver including a DSSS baseband processor for identifying codewords in the received bit streams based on the modulating codes formulated by transmitter 800 illustrated in FIG. 8. In FIG. 9, DSSS receiver 900 includes antenna 212, RF amplifier 202, down converter 204, phase IF-demodulator 206, DSSS baseband processor 500, and frequency synthesizer 702. DSSS baseband processor 500 is preferably capable of extracting the transmitted data words from the received information based on the modulating codes, as described above with respect to FIG. 5. Frequency synthesizer 702 is preferably capable of synchronizing with the carrier frequency with the received signal and may comprise modules 312, 314, 316, 318, and 320 described above with respect to FIG. 2.

The received RF signal goes from the antenna 212 to the input of the RF amplifier 202, where it is amplified in the band defined by selection circuits, included in the structure of the amplifier 202, and goes to the input of down converter 204. In down converter 204, under the effect of a signal coming from the frequency synthesizer 702, the RF signal is converted to an IF signal. In the standard operation, the signal conversion is applied in down converter 204 and can be implemented, for example, using a regular signal multiplier.

The IF signal goes to the phase IF-demodulator 206, where it is converted under the effect of a signal with frequency equal to intermediate frequency signal, coming from the second output of the frequency synthesizer 702. As a result of such a conversion, the signal, which is an impulse sequence of MCs, appears at the output of the phase IF-demodulator 206. Such a conversion is possible if the signal coming to the phase IF-demodulator 206 from frequency synthesizer 702 is synchronized with a signal of sub-carrier (intermediate) frequency. Such synchronization is achieved during phase auto-tuning operation of the oscillator of the frequency synthesizer 702, from which the signal goes to the phase IF-demodulator 206.

If the frequency-comparing signal is already transformed in such a way that it does not contain elements carrying information about the phase change contained in the received radio signal, then auto-tuning is possible. Such conversion can be implemented, for example, by squaring the value of a signal and subsequent filtering (for binary phase modulation) or by raising the signal value to the power of four and subsequent filtering (for quadrature phase modulation). Similar conversions are described in the above-referenced co-pending U.S. patent application.

Phase IF demodulator 206 can be implemented in the regular way using Gillbert cells. The IF signal voltage from the output of the converter module 204 and the signal voltage from the second output of the frequency synthesizer module 702 go to the multiplying inputs of the Gillbert cells. Then the signal, that outputs from the frequency synthesizer 702, goes to the one of the multiplying units through the phase shifting circuit that has the phase shift equal to $\pi/2$, if the phase IF demodulator has two quadrature channels. In addition, in the case of two quadrature channels, the connections between IF demodulator 206 and DSSS processor 500 is implemented as two physical connections. The output from the first channel of the phase IF demodulator 206 is connected to the first input of the DSSS processor 210 and the output from the second channel is connected to the second input of the DSSS processor 500.

The signal from the output of the phase IF-demodulator, which is a decoded MC impulse sequence, goes to the input of DSSS processor 500. See the description of DSSS processor 500 above. Because the transmitted data is converted into MCs having the structure described above, even if synchronization is lost, transmitted codes can be identified.

It will be understood that various details of the invention may be changed without departing from the scope of the invention. Furthermore, the foregoing description is for the purpose of illustration only, and not for the purpose of limitation—the invention being defined by the claims.

What is claimed is:

1. A spread spectrum communication system for converting data into a code sequence for facilitating codeword identification by a spread spectrum receiver based only on the received signal and without transmission of a synchronization preamble in addition to the information signal, the system comprising:

a) a spread spectrum transmitter for converting information to be transmitted into a stream of digital data, for converting the stream of digital data into a sequence of codewords, the codewords being structured to allow a spread spectrum receiver to identify the codewords when receiver synchronization is lost and restored without using a synchronization preamble, wherein the spread spectrum transmitter divides the stream of digital data into consecutive even and odd tetrad pairs, the codewords are divided into first and second groups, the even tetrad pairs are used to select codewords from the first group and the odd tetrad pairs are used to select codewords from the second group; and b) a spread spectrum receiver for receiving a spread spectrum signal containing the codewords, for identifying codeword boundaries in the received spread spectrum signal based only on the codewords, and for extracting the digital data from the spread spectrum signal.

2. The system of claim 1 wherein the codewords are structured such that a sequence of codewords alternately selected from the first and second groups and alternatingly positioned in the sequence does not include any codewords from the first and second groups other than the selected codewords in the selected positions.

3. A spread spectrum transmitter for converting information to be transmitted into a digital sequence, for converting the digital sequence into a code sequence having properties that allow synchronized decoding and conversion of the digital code sequence into source information by a spread spectrum receiver, and for converting the code sequence into a radio frequency (RF) signal and transmitting the RF signal to the spread spectrum receiver, the spread spectrum transmitter comprising:

(a) a direct sequence spread spectrum (DSSS) processor for receiving digital data to be transmitted, dividing the digital data into tetrad pairs, and substituting codewords for each of the tetrad pairs, wherein each codeword is selected from a first group of codewords or a second group of codewords and codewords from the first and second groups are structured such that a bit sequence comprising codewords alternatingly selected from the first and second groups and alternatingly positioned in the bit sequence does not include any codewords from the first and second groups other than the selected codewords in the selected positions;

(b) a phase intermediate frequency (IF) modulator coupled to the DSSS processor for modulating IF signals based on the codewords;

(c) a converter coupled to the phase IF modulator for converting the modulated IF signals into RF signals using a heterodyne signal;

(d) an RF signal amplifier coupled to the converter for amplifying the RF signals and performing impedance matching with an antenna; and (e) a frequency synthesizer coupled to the phase IF modulator and the converter and for generating the intermediate frequency and heterodyne signals.

4. The spread spectrum transmitter of claim 3 wherein the phase IF modulator comprises a binary phase modulator.

5. The spread spectrum transmitter of claim 3 wherein the phase IF modulator comprises a quadrature phase modulator.

6. A direct sequence spread spectrum (DSSS) processor for a spread spectrum transmitter for dividing digital source information into tetrad pairs and for substituting modulating codes for the tetrad pairs, the DSSS processor comprising:

(a) a code groups generator for receiving a digital bit sequence to be transmitted and dividing the digital bit sequence into consecutive tetrad pairs;

(b) a storage device connected to the code groups generator for storing modulating code values and for substituting the modulating code values for the tetrad pairs; and (c) a basic frequency and time interval module coupled to the code groups generator and to the storage device for generating clock signals for proper functioning of the code groups generator and the storage device.

7. The DSSS processor of claim 6 wherein the code groups generator divides the digital bit sequence into even and odd tetrad pairs.

8. The DSSS processor of claim 7 wherein the modulating codes represent 8-element impulse sequences.

9. The DSSS processor of claim 8 wherein the number of modulating code values stored in the storage device is equal to 32.

10. The DSSS processor of claim 9, wherein the modulating codes are divided into first and second groups.

11. The DSSS processor of claim 10 wherein the modulating codes of the first and second groups are structured such that a bit sequence containing modulating codes alternatingly selected from the first and second groups and alternatingly positioned in the bit sequence does not contain any modulating codes from the first and second groups other than the selected modulating codes in the selected positions.

12. The DSSS processor of claim 11 wherein an even tetrad pair leads to selection of modulating codes from the first group, and an odd tetrad pair leads to selection of modulating codes from the second group.

13. A direct sequence spread spectrum (DSSS) processor for a spread spectrum receiver, the DSSS processor for converting modulating code impulse sequences into a source digital information sequence, the DSSS processor comprising:

(a) a first code conversion module for receiving modulating codes and for converting the modulating codes into consecutive tetrad pairs; and (b) a second code conversion module for receiving modulating codes and for converting, synchronously with the first code conversion module, the modulating codes into consecutive tetrad pairs, wherein each of the tetrad pairs includes a first tetrad corresponding to a modulating code from a first code group and a second tetrad corresponding to a modulating code from a second code group, and the first and second code conversion modules generate a sign for pairs of identified modulating codes.

14. The DSSS processor of claim 13 wherein the first and second code conversion modules each include:

(a) a first code group identification module for identifying codes from the first code group by comparing the received modulating codes with modulating code values from the first code group;

(b) a second code group identification module coupled to the first code group identification module for identifying codes from the second code group by comparing the received modulating codes with modulating code values from the second code group;

(c) a direct codes identification simultaneity detection module coupled to the first and second code group identification modules for generating an impulse coincidence signal in response to a match between a received modulating code and one of the modulating codes from the first and second code groups;

(d) an inverse codes identification simultaneity detection module coupled to the first and second code group identification modules and for generating an impulse coincidence signal in response to a match between a received modulating code and the inverse of one of the modulating codes from the first and second code groups;

(e) a multiplexor coupled to the first code group identification module, the second code group identification module, the direct codes identification simultaneity detection module, and the inverse codes identification simultaneity detection module for connecting signals from the first or second code group identification modules to its output based on the coincidence signals output from the simultaneity detection modules;

(f) a decipherer coupled to the multiplexor for replacing identified modulating codes pairs with tetrad pairs;

(g) a modulating codes sign analysis module coupled to the first and second code conversion modules for generating modulating code pairs sign coincidence or sign non-coincidence signals, wherein the first and second code conversion modules perform comparisons in response to the modulating code pairs sign coincidence or sign non-coincidence signals; and (h) an original digital sequence restoring module coupled to the first and second code conversion modules for restoring source digital information sequences based on the tetrad pairs output from the first and second code conversion modules.

15. The DSSS processor of claim 14 wherein, in response to the modulating code pairs sign coincidence signal, a first tetrad from a pair of tetrads received from the first code conversion module is placed in a first position in an output data sequence including first, second, third, and fourth consecutive positions, a first tetrad from a second pair of tetrads received from the second code conversion module is placed in the second position in the output data sequence, a second tetrad from the first pair of tetrads is placed in the third position in the output data sequence, and a second tetrad from the second pair of tetrads is placed in the fourth position in the output data sequence.

16. The DSSS processor of claim 15 wherein, in response to the modulating signal code pairs sign noncoincidence signal, a first tetrad from a first pair of tetrads received from the first code conversion module is placed in a second position in an output data sequence containing first, second, third, and fourth consecutive positions, a first tetrad from a second pair of tetrads received from the second codes conversion module is placed in the first position in the output data sequence, a second tetrad from the first pair of tetrads is placed in the fourth position in the output data stream, and a second tetrad from the second pair of tetrads is placed in the third position in the output data sequence.

17. A spread spectrum communication method comprising:

(a) dividing a sequence of digital data to be transmitted in a spread spectrum communication system into first and second tetrad pairs;

(b) for each of the tetrad pairs, selecting a codeword from a first code group or a second code group; and (c) formulating a bit stream to be transmitted to a spread spectrum receiver, the bit stream including codewords alternatingly selected from the first and second code groups and alternatingly positioned in the bit stream, wherein the bit stream does not include any codewords from the first and second code groups other than the selected codewords in the selected positions.

18. The method of claim 17 comprising modulating a carrier signal using the bit stream of codewords and transmitting the modulated carrier signal from a spread spectrum transmitter to the spread spectrum receiver.

19. The method of claim 18 comprising, at the spread spectrum receiver, synchronizing with the carrier signal and identifying the transmitted data by detecting the alternating sequence of codewords from the first and second groups.

20. The method of claim 18 wherein identifying the transmitted data includes identifying the transmitted data without using a synchronization preamble.

21. The method of claim 18 comprising ordering the codewords to form the transmitted data based on whether the codewords are direct or inverse modulating codewords.

* * * * *